United States Patent [19]
Park et al.

[11] Patent Number: 5,729,571
[45] Date of Patent: Mar. 17, 1998

[54] NON-COHERENT DIGITAL RECEIVER OF A SPREAD SPECTRUM COMMUNICATION SYSTEM

[75] Inventors: Jong-Hyeon Park, Seoul; Je-Woo Kim, Suwon, both of Rep. of Korea

[73] Assignee: SamSung Electronics Co. Ltd., Kyungki-do, Rep. of Korea

[21] Appl. No.: 496,473

[22] Filed: Jun. 29, 1995

[30] Foreign Application Priority Data

Jun. 29, 1994 [KR] Rep. of Korea ............... 1994-15259

[51] Int. Cl.$^6$ ............................................. H04B 1/707
[52] U.S. Cl. ............................................. 375/206
[58] Field of Search ............................. 375/206, 208, 375/209, 210, 200

[56] References Cited

U.S. PATENT DOCUMENTS

| | | |
|---|---|---|
| 4,203,071 | 5/1980 | Bowles et al. . |
| 4,214,209 | 7/1980 | Baier et al. . |
| 4,327,438 | 4/1982 | Baier et al. . |
| 4,423,517 | 12/1983 | Danno et al. . |
| 4,435,822 | 3/1984 | Spencer et al. . |
| 4,530,103 | 7/1985 | Mosley et al. . |
| 4,575,861 | 3/1986 | Levreault . |
| 4,649,549 | 3/1987 | Halpern et al. . |
| 4,672,629 | 6/1987 | Beier . |
| 4,875,221 | 10/1989 | Mori . |
| 4,933,953 | 6/1990 | Yagi . |
| 5,031,191 | 7/1991 | Hiramatsu . |
| 5,105,437 | 4/1992 | Kingston . |
| 5,111,478 | 5/1992 | McDonald . |
| 5,166,952 | 11/1992 | Omurg et al. . |
| 5,184,135 | 2/1993 | Paradise . |
| 5,199,050 | 3/1993 | Linsky . |
| 5,245,612 | 9/1993 | Kachi et al. . |
| 5,258,995 | 11/1993 | Su et al. ............... 375/206 |
| 5,396,515 | 3/1995 | Dixon et al. . |
| 5,400,359 | 3/1995 | Hikoso et al. . |
| 5,440,597 | 8/1995 | Chung et al. ............... 375/206 |

FOREIGN PATENT DOCUMENTS 3-88526  4/1991  Japan ............... 375/208

*Primary Examiner*—Stephen Chin
*Assistant Examiner*—Jeffrey W. Gluck
*Attorney, Agent, or Firm*—Robert E. Bushnell, Esq.

[57] ABSTRACT

A non-coherent digital receiver of a spread spectrum communication system for baseband synchronizing of a reference pseudo-noise sequence with a received pseudo-noise sequence modulated in a received spread spectrum signal. The digital receiver includes a receiving unit for translating the spread spectrum signal into an in-phase signal and a quadrature-phase signal; a pseudo-noise code generator for generating a reference pseudo-noise code sequence comprising a pseudo-noise early code, a pseudo-noise punctual code, and a pseudo-noise late code; a correlator unit for correlating the in-phase signal and the quadrature-phase signal with the reference pseudo-noise code sequence to produce early, punctual, and late correlation signals comprising in-phase and quadrature-phase components; an adaptive threshold control unit for adaptively generating a variable threshold in response to the pseudo-noise punctual code and the in-phase and quadrature-phase signals; a synchronization detecting and tracking unit for detecting initial synchronization and phase difference between the received pseudo-noise code sequence modulated in the spread spectrum signal and the reference pseudo-noise code sequence for controlling generation of the reference pseudo-noise code sequence and synchronization between the received pseudo-noise code sequence and the reference pseudo-noise code sequence; and a demodulator for demodulating the spread spectrum signal into a baseband signal.

22 Claims, 4 Drawing Sheets

NON-COHERENT DIGITAL RECEIVER OF A SPREAD SPECTRUM COMMUNICATION SYSTEM

CROSS-REFERENCE TO RELATED APPLICATIONS

This application makes reference to, incorporates the same herein, and claims all benefits accruing under 35 U.S.C. §119 from an application for Non-coherent Digital Receiver Of A Spread Spectrum Communication System earlier filed in the Korean Industrial Property Office on 29 Jun. 1994 and assigned Ser. No. 15259/1994.

BACKGROUND OF THE INVENTION

1. Technical Field

The present invention relates to a spread spectrum communication system using a pseudo-random noise (PN) code, particularly to a digital receiver system for demodulating reception data into original data through digital processing, non-coherent detection, synchronization tracking and initial synchronization of a spread spectrum reception signal.

2. Background Art

Conventionally, narrow band modulation systems (such as for example, amplitude modulation, frequency modulation and binary phase shift keying) have been used in the field of data communication. With such systems, demodulation at the receiver can be achieved with a relatively small amount of circuitry. Such systems, however, are weak and susceptible to multipath fading and narrow band noise.

By contrast, in spread spectrum communication systems, a data spectrum is spread by a pseudo noise code (hereinafter "PN code") at a transmitting side, while the pseudo noise code and the data are synchronized at a receiving side so that the adverse effects of multipath fading and narrow band noise can be reduced. Accordingly, spread spectrum communication systems have attracted increased attention as a promising technique for radio frequency transmission of binary data.

One example for such a spread spectrum communication system is disclosed in U.S. Pat. No. 5,400,359 entitled Spread Spectrum Communication System And An Apparatus For Communication Utilizing This System issued to Hikoso et al. on 21 Mar. 1995. In Hikoso et al. '359, a pseudo noise code is generated and multiplied by data to generate a multiplied result which is then subjected to binary phase shift key (BPSK) modulation. The pseudo noise code is also subjected to BPSK modulation, delayed by at least one chip of the pseudo noise code, combined with a modulated signal, converted into a radio frequency (RF) signal, and transmitted from an antenna. The transmitted spread spectrum signal is received at a receiving side where a complementary receiving method is provided. In essence, the spread spectrum communication involves the art of expanding the bandwidth of a signal, transmitting the expanded signal, and recovering the desired signal by remapping the received spread spectrum into the original information bandwidth. The purpose of spread spectrum techniques is to allow the system to deliver error-free information in a noisy signal environment.

In such a spread spectrum communication system however, since the spectrum of the information signal is spread by a PN code having a broader spectrum width, in order to correctly restore the information signal, it is necessary to synchronize the demodulation PN code which is generated at the receiving side with the modulation PN code which is generated at the transmitting side. Proper phase synchronization is typically achieved when the received spread spectrum signal is accurately timed in both its spreading PN code pattern position and its rate of chip generation. The phase synchronization process is divided into two steps, i.e., an initial synchronization process for finding a synchronous phase and a process for tracking the detected phase. Known technologies for the initial synchronization are both analog and digital sliding correlators, matched filters and others. Known tracking technologies are a tau-dither tracking and a delay lock tracking. Such a slider correlator as disclosed for example, in U.S. Pat. No. 4,423,517 for Code Sequence Synchronization System For Spread Spectrum Communication Receiver issued to Danno, U.S. Pat. No. 4,649,549 for Apparatus For Synchronizing Linear PN Sequences issued to Halpern et al., and U.S. Pat. No. 5,111,478 for Method And Apparatus For Providing Signal Synchronization In A Spread Spectrum Communication System issued to McDonald, is generally configured to continuously change the phase of a reference PN code by slightly shifting the frequency of a reference PN clock with respect to a transmission PN code generating clock in order to find a synchronous phase. Instead of shifting the frequency, the code phase may be varied stepwisely such as one disclosed in U.S. Pat. No. 5,184,135 for Phase Measurement Of Received Pseudonoise Sequence Using Digital Correlation issued to Paradise. However, both cases require a long time until the synchronous phase is detected.

The use of matched filters as disclosed in U.S. Pat. No. 4,203,071 for Pseudo-Random-Number-Code-Detection And Tracking System issued to Bowles et al., U.S. Pat. No. 5,031,191 for Spread Spectrum Signal Demodulation Circuit issued to Hiramatsu et al., U.S. Pat. No. 5,166,952 for Method And Apparatus For The Reception And Demodulation Of Spread Spectrum Radio Signals issued to Omurg et al. is effective to decrease the time. However, the implementation of matched filters often requires expensive and complex circuitry.

Tracking technologies using tau-dither tracking and delay lock tracking schemes such as ones disclosed in U.S. Pat. No. 5,048,053 for Detecting And Tracking Circuit For Component PN Codes issued to Mower et al., and U.S. Pat. No. 5,105,437 for Programmable Digital Acquisition And Tracking Controller issued to Kingston et al., on the other hand, have also utilized costly RF components. Such synchronization tracking is usually performed by measuring the correlation at early and late times as is discussed in U.S. Pat. No. 4,672,629 for Receiver For Bandspread Signals issued to Beier, U.S. Pat. No. 5,199,050 for Pseudorandom (PN) Signal Synchronization Circuit And Related Method issued to Linsky, and forming a time discrimination function from such measurements to control the receiver's reference timing.

In these conventional spread spectrum receivers, initial synchronization and synchronization tracking are achieved however often through costly and complex circuitry. Moreover, we have observed that false alarm and false tracking have often triggered and the time required to establish initial synchronization has not effectively improved.

SUMMARY OF THE INVENTION

Accordingly, it is therefore an object of the present invention to provide a spread spectrum receiver which can be miniaturized and prevent malfunction due to noise.

It is another object of the present invention to provide a spread spectrum receiver which is inexpensive and can be easily implemented in digital circuitry.

It is yet another object of the present invention to provide a spread spectrum receiver capable of preventing the generation of false alarm or false tracking.

It is still another object of the present invention to provide the receiver of the spread spectrum communication system capable of reducing the time required for an initial synchronization.

To achieve these and other objectives, the digital receiver according to the present invention includes a receiving unit for translating the spread spectrum signal into an in-phase signal and a quadrature-phase signal; a pseudo-noise code generator for generating a reference pseudo-noise code sequence comprising a pseudo-noise early code, a pseudo-noise punctual code, and a pseudo-noise late code; a correlator unit for correlating the in-phase signal and the quadrature-phase signal with the reference pseudo-noise code sequence to produce early, punctual, and late correlation signals comprising in-phase and quadrature-phase components; an adaptive threshold control unit for adaptively generating a variable threshold in response to the pseudo-noise punctual code and the in-phase and quadrature-phase signals; a synchronization detecting and tracking unit for detecting initial synchronization and phase difference between the received pseudo-noise code sequence modulated in the spread spectrum signal and the reference pseudo-noise code sequence for controlling generation of the reference pseudo-noise code sequence and synchronization between the received pseudo-noise code sequence and the reference pseudo-noise code sequence; and a demodulator for demodulating the spread spectrum signal into a baseband signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
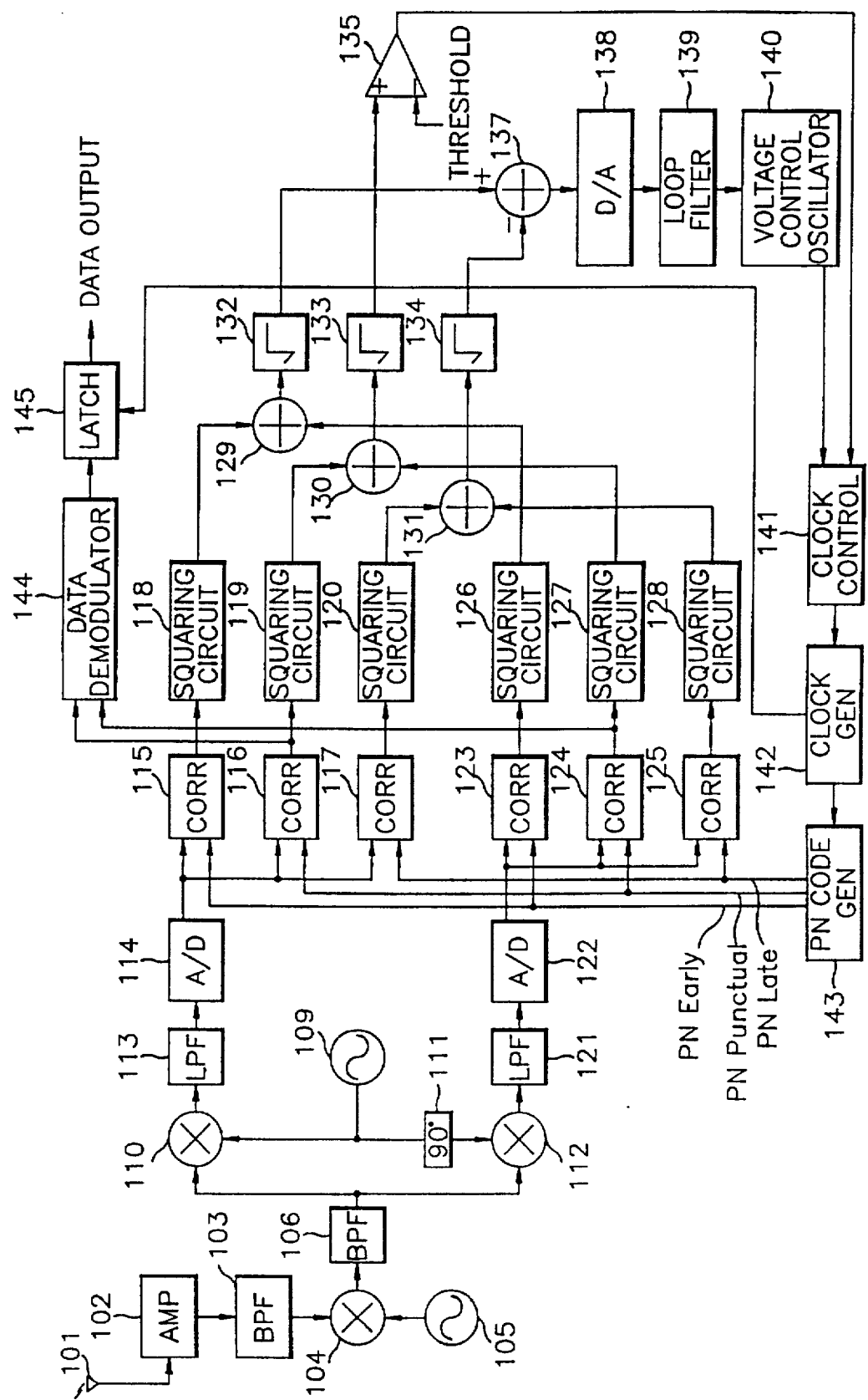
FIG. 1 is a block diagram showing the construction of a conventional digital receiver.

Referring to FIG. 1, a conventional receiver of the spread spectrum communication system is illustrated. Typically, the receiver is used to demodulate a received spread spectrum signal into original data through the digital processing and non-coherent detection of the spread spectrum signal. The demodulation and non-coherent detection operation will now be described with reference to FIG. 1.

The spread spectrum signal received from an antenna 101 is amplified by an amplifier 102, and then is passed through a band-pass filter BPF 103. The mixer 104 mixes the filtered spread spectrum signal with a carrier signal generated from a carrier generator 105 so as to remove the carrier from the received spread spectrum signal for subsequent conversion into an intermediate-frequency (IF) signal. Thereafter, the mixed signal is passed through another band-pass filter BPF 106. At this time, an IF oscillator 109 generates an IF oscillation signal in order to convert the received spread spectrum signal into the IF signal. The output of the BPF 106 is separated into an in-phase (I-channel) spread signal and a quadrature-phase (Q-channel) spread signal to perform the non-coherent detection and then the IF components thereof are respectively removed at the mixers 110 and 112. The IF oscillation signal is phase-shifted by $\pi/2$ through a $\pi/2$ phase shifter 111 and then is multiplied by the quadrature-phase spread signal. The construction for processing the Q-channel spread signal is the same as that for processing the I-channel spread signal, and the description will be made on the basis of the operation for separating and processing the I-channel spread signal.

The I-channel spread signal in which the carrier and IF components have been removed by the mixer 110 is passed through a low-pass filter LPF 113 and then is converted into a digital signal by an A/D converter 114. The sampling rate at the digital conversion is typically more than twice a PN chip rate. The I-channel spread signal which has been converted into a digital signal is multiplied by PN early, PN punctual and PN late codes outputted from a reference PN code generator 143 and then is reverse-spread through the correlators 115, 116 and 117, respectively. The phase of the early PN code is faster than that of the punctual PN code by ½ chip ($\pi/2$), and the late PN code is phase-delayed by ½ chip ($\pi/2$) in comparison with the punctual PN code. Assuming that the punctual PN code is P(t), and each chip duration is Tc, the early, punctual and late PN codes are respectively designated as follows:

$$\text{Early } PN \text{ Code} = P\left(t + \frac{T_c}{2}\right) \quad (1)$$

$$\text{Punctual } PN \text{ code} = P(t) \quad (2)$$

$$\text{Late } PN \text{ code} = P\left(t - \frac{T_c}{2}\right). \quad (3)$$

The correlators 115, 116 and 117 generally take the correlation every data symbol, and one data symbol may be a period of the PN code sequence or a part of the long PN code sequence. The I-channel digital spread signals outputted from the correlators 115, 116 and 117 are respectively squared at the squaring circuits 118, 119 and 120.

The Q-channel spread signal in which the carrier and IF components have been removed by the mixer 112 is passed through another low-pass filter LPF 121 and then is converted into a digital signal through an A/D converter 122. The sampling rate at the digital conversion is also typically more than twice the PN chip rate. The Q-channel digital spread signal which has been converted into the digital signal is multiplied by the early, punctual and late PN codes outputted from the reference PN code generator 143 to take the correlation and then is reverse-spread through the correlators 123, 124 and 125. The Q-channel digital spread signals outputted from the correlators 123, 124 and 125 are respectively squared through the squaring circuits 126, 127 and 128. The I-channel digital spread signal outputted from the squaring circuit 118 and the Q-channel digital spread signal outputted from the squaring circuit 126 are added at an adder 129. The output signal of the adder 129 is applied to a square root circuit 132 and then is outputted as an early correlation-compensated signal compensated for any non-coherent effect. The I-channel digital spread signal outputted from the squaring circuit 119 and the Q-channel digital spread signal outputted from the squaring circuit 127 are added at an adder 130. The output signal of the adder 130 is applied to a square root circuit 133 and then is outputted as a punctual correlation-compensated signal compensated for the non-coherent effect. The I-channel spread signal outputted from the squaring circuit 120 and the Q-channel spread signal outputted from the squaring circuit 128 are added at an adder 131. The output signal of the adder 131 is applied to a square root circuit 134 and then is outputted as a late correlation-compensated signal compensated for the non-coherent effect. The punctual correlation-compensated signal is used for the initial synchronization, and the early and late correlation-compensated signals are used for the synchronization tracking. In case of spreading a single data symbol for each period of the PN code, the early correlation-compensated signal takes the correlation for one period of the PN code and shows a typical self-correlation feature. However, in case of spreading a data symbol corresponding to a part of the PN code sequence, the early correlation-compensated signal takes the correlation for a part of the PN code sequence corresponding to the data symbol. Such a typical partial correlation feature of the early signal makes the initial synchronization and synchronization tracking difficult. Initial synchronization is achieved by synchronizing the phase of the received PN code with the phase of the reference PN code within one chip. Comparator 135 then compares the punctual correlation-compensated signal outputted from the square root circuit 133 and a predetermined threshold so as to determine whether initial synchronization has been achieved. Initial synchronization is not achieved if the punctual correlation-compensated signal is less than the predetermined threshold. Thus, the clock controller 141 which receives the signal outputted from the comparator 135 indicating whether or not the initial synchronization has been achieved controls a clock generator 142 to generate a PN clock as late as one chip in the case that the initial synchronization has not been achieved. The PN code generator 143 receives a single chip-delayed PN clock and then generates a single chip-delayed PN code to the correlators 115, 116 and 117, respectively. Hence, the correlators 115, 116, 117, 123, 124 and 125 respectively take the correlations between the single chip-delayed PN code outputted from the PN code generator 143 and the I-channel digital signal outputted from the A/D converter 114 and between the single chip-delayed PN codes and the Q-channel digital spread signal outputted from the A/D converter 122. Thereafter, the previously described operations are repeated until the initial synchronization is achieved.

In the case that the punctual correlation-compensated signal outputted from the square root circuit 133 is greater than the threshold of the comparator 135, the comparator 135 indicates that the initial synchronization has been achieved, and then operates to enable the synchronization tracking and the demodulation of the baseband data. The synchronization tracking functions to accord the phase of the reference PN code with the phase of the received PN code modulated in the spread spectrum signal which have been synchronized within 1 chip, and to maintain the in-phase between these two signals. In order to perform the synchronization tracking, the adder 137 adds the early correlation-compensated signal to the late correlation-compensated signal. In this case, since the marks thereof are opposite, the signal outputted from the adder 137 represents an error signal reflecting a phase difference between the reference PN code and the received spread signal. The error signal outputted from the adder 137 is converted into an analog signal through the D/A converter 138. The error signal thus converted is filtered through a loop filter 139 and is then applied to a voltage controlled oscillator 140. The voltage controlled oscillator 140 receives the filtered signal, and applies an oscillation frequency to the clock controller 141. That is, if the early correlation-compensated signal outputted from the square root circuit 132 is greater than the late correlation-compensated signal outputted from the square root circuit 134, the phase of the received spread signal is ahead in comparison with the phase of the reference PN code. Therefore, the reference PN code should be made in phased with the received spread spectrum signal by making the PN clock of the clock generator 142 fast in proportion to the phase difference between the reference PN code and received spread spectrum signal.

On the contrary, if the late correlation-compensated signal outputted from the square root circuit 134 is greater than the early correlation-compensated signal outputted from the square root circuit 132, the phase of the received spread spectrum signal is delayed in comparison with the phase of the reference PN code. Therefore, the reference PN signal should be in-phased with the received spread spectrum signal by making the PN clock of the clock generator 142 late in proportion to the phase difference between the reference PN code and the received spread spectrum signal. The comparator 135 continuously detects whether or not the synchronization is achieved even during the synchronization tracking. If the punctual correlation-compensated signal outputted from the square root circuit 133 is less than the predetermined threshold, the comparator 135 detects that there occurred a synchronization tracking failure or a synchronization loss, and thus repeats the previously described initial synchronization operation. When the initial synchronization has been achieved, the demodulator 144 receives the I-channel and Q-channel punctual digital signals outputted from the correlators 116 and 124 for demodulation into baseband data. The latch 145 synchronizes the demodulated data with the data clock outputted from the clock generator 142 and then outputs the synchronized data. Generally, convention data demodulation techniques such as for example, BPSK, QPSK, DBPSK and DQPSK may be used, and such will be determined in correspondence with the modulation techniques used in the transmitter.

While such conventional receiver of the non-coherent digital spread spectrum communication system makes the best use of current spread spectrum techniques, we have observed and discovered that such receiver suffers a multitude of deficiencies.

First, in case of spreading each data symbol corresponding to a part of the PN code sequence, the early, punctual and late signals respectively outputted from the square root circuits 132, 133 and 134 show a partial correlation feature. Since the initial synchronization and synchronization tracking are performed by using these signals showing the partial correlation feature, a false alarm or a false tracking fail may, and has often occurred in the PN code synchronization.

Second, since only punctual signal outputted from the square root circuit 133 is used to determine whether or not the initial synchronization has been achieved, in case of searching the PN code every one chip during the initial synchronization, the variance of the punctual signal is so great even when the phases of the transmission/reception PN codes are synchronized within one chip, so that it is difficult to accurately set up the threshold. In case of searching the PN code every ½ chip, the variance of the punctual signal can be reduced, however, the time required to detect the initial synchronization is increased.

Third, since the spread spectrum signal varies every moment, in case of detecting whether or not the synchronization has been achieved by comparing the punctual signal with the predetermined threshold, may deteriorate the performance of the system.

Fourth, if the punctual signal becomes instantaneously greater than the threshold due to noise even when the punctual signal is not actually synchronized with the predetermined threshold, false alarm may occur. Further, if the punctual signal becomes instantaneously lower than the threshold due to the noise even when the punctual signal is actually synchronized with the predetermined threshold, false tracking failure may occur.

Finally, since the synchronization tracking is performed converter 138, loop filter 139, and voltage controlled oscillator 140, it is difficult to digitalize and miniaturize the system.

Figure 2A:
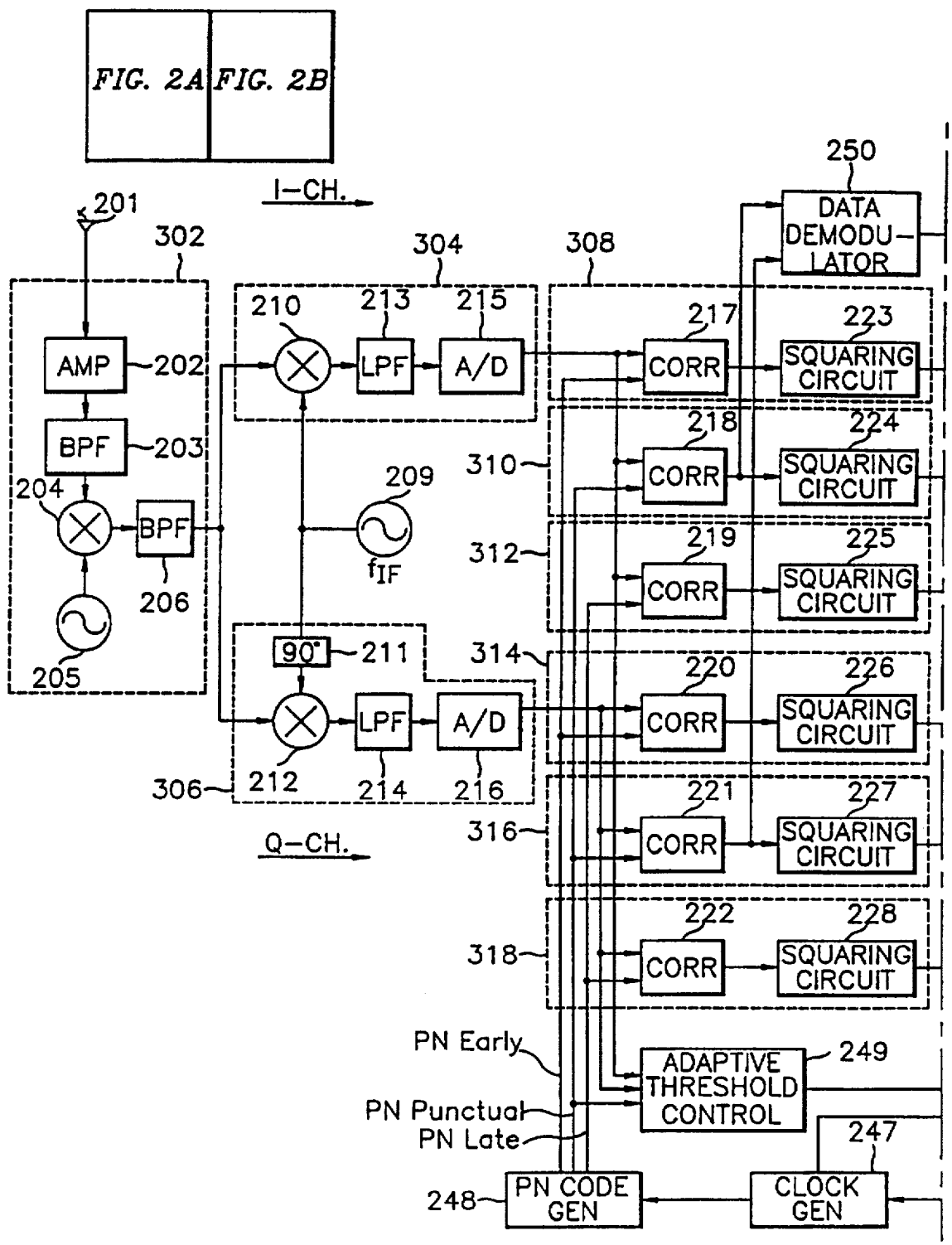
FIGS. 2A and 2B are block diagrams showing the construction of a non-coherent digital receiver according to the present invention.
Figure 2B:
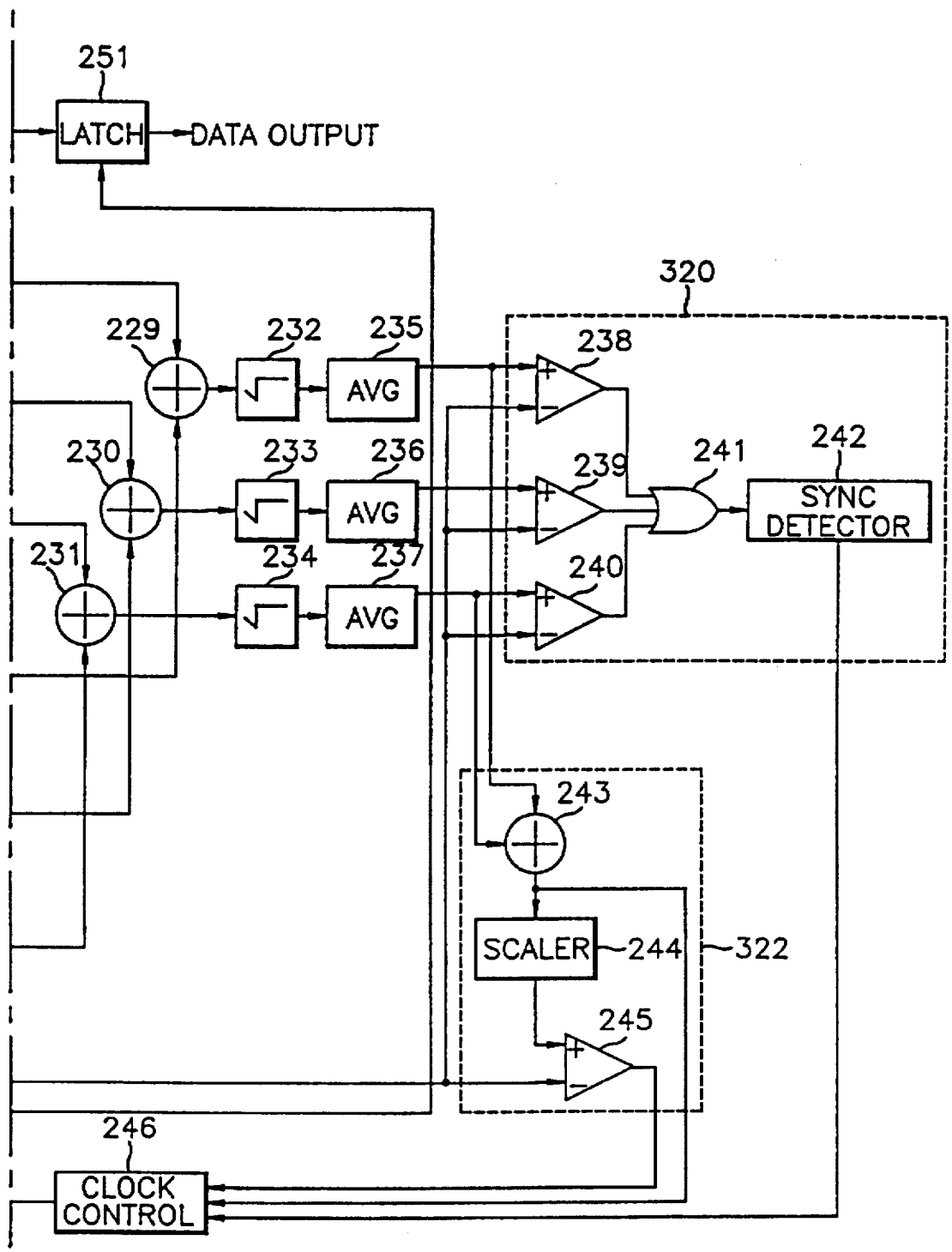

Accordingly, we have conceived and designed a novel non-coherent digital receiver that would overcome the above deficiencies discovered in the conventional digital receiver. The novel non-coherent digital receiver according to the present invention is illustrated in FIGS. 2A and 2B. As shown in FIGS. 2A and 2B, the non-coherent digital receiver comprises a receiving unit 302, an in-phase converting unit 304, and a quadrature-phase converting unit 306 for receiving and translating the spread spectrum signal into an in-phase (I-channel) spread signal and a quadrature-phase (Q-channel) spread signal; a pseudo-noise code generator 248 for generating a reference pseudo-noise code sequence comprising a PN early code, a PN punctual code, and a PN late code; a correlator unit comprising in-phase early, punctual, and late loops 308, 310, 312 and quadrature-phase early, punctual, and late loops 314, 316, 318 for correlating the I-channel spread signal and the Q-channel spread signal with the reference pseudo-noise code sequence; adders 229, 230, 231, square root circuits 232, 233,234 and average circuits 235, 236, 237 are used to compensate the partial correlation effect during establishing initial synchronization and synchronization tracking to produce early, punctual, and late correlation-compensated signals; an adaptive threshold control unit 249 for receiving the I-channel and Q-channel spread signals and for adaptively generating a variable threshold in response to the PN punctual code; an initial synchronization detecting unit 320 for establishing initial synchronization by comparing the early, punctual, and late correlation-compensated signals with the variable threshold; a synchronization tracking control unit 322 for detecting a phase difference between the received pseudo-noise code sequence modulated in the spread spectrum signal and the reference pseudo-noise code sequence and generating a signal tracking control signal; a clock control 246 and a clock generator 247 connected to the initial synchronization detecting unit 320 and the synchronization tracking control unit 322, for generating a PN clock so as to control generation of the reference PN code sequence and synchronization between the received PN code sequence modulated in the spread spectrum signal and the reference PN code sequence; and a demodulator 250 for demodulating the spread spectrum signal into a baseband signal.

The receiving unit 210 is comprised of an amplifier 202, a BPF 203, a carrier generator 205, a mixer 204 and a BPF 206, for removing the carrier of a received spread spectrum signal and converting the received spread spectrum signal into an IF signal. The in-phase converting unit 304 is comprised of a mixer 210, a LPF 213 and an A/D converter 215, for mixing the IF converted signal with an IF oscillation signal generated from an IF oscillator 209 so as to remove IF components, extract in-phase components and then output an I-channel digital spread signal. The in-phase early loop 308 is comprised of a correlator 217 and a squaring circuit 223, for taking the correlation between the I-channel digital spread signal of the in-phase converting unit 304 and the PN early code generated from the PN code generator 248, squaring the correlation and then outputting an early I-channel correlation signal. The in-phase punctual loop 310 is comprised of a correlator 218 and a squaring circuit 224, for taking the correlation between the I-channel digital spread signal from the in-phase convening unit 304 and the PN punctual code generated from the PN code generator 248, squaring the correlation and then outputting a punctual I-channel correlation signal. The in-phase late loop 312 is comprised of a correlator 219 and a squaring circuit 225, for taking the correlation between the I-channel digital spread signal from the in-phase converting part 304 and the PN late code generated from the PN code generator 248, squaring the correlation and then outputting a late I-channel correlation signal.

Similarly, the quadrature-phase convening unit 306 is comprised of a π/2 phase shifter 211, a mixer 212, a LPF 214 and an A/D converter 216, for mixing the IF converted signal with the IF oscillation signal which has been phase shifted by π/2 so as to remove the IF components, extract the quadrature-phase components and outputting a Q-channel digital spread signal. The quadrature-phase early loop 314 is comprised of a correlator 220 and a squaring circuit 226, for taking the correlation between the Q-channel digital spread signal from the quadrature-phase converting unit 306 and the PN early code generated from the PN code generator 248, squaring the correlation and outputting an early Q-channel correlation signal. The quadrature-phase punctual loop 316 is comprised of a correlator 221 and a squaring circuit 227, for taking the correlation between the Q-channel digital spread signal from the quadrature-phase converting pan 306 and the PN punctual code generated from the PN code generator 248, squaring the correlation and outputting a punctual Q-channel correlation signal. The quadrature-phase late loop 318 is comprised of a correlator 222 and a squaring circuit 228, for taking the correlation between the Q-channel digital spread signal from the quadrature-phase converting part 306 and the PN late code generated from the PN code generator 248, squaring the correlation and outputting a late Q-channel correlation signal.

First adder 229 is used to add the early I-channel correlation signal from the in-phase early loop 308 to the early Q-channel correlation signal from the quadrature-phase early loop 314 so as to produce an early correlation signal. The second adder 230 is used to add the punctual I-channel correlation signal from the in-phase punctual loop 310 to the punctual Q-channel correlation signal from the quadrature-phase punctual loop 316 so as to produce a punctual correlation signal. The third adder 231 is used to add the late I-channel correlation signal from the in-phase late loop 312 to the late Q-channel correlation signal from the quadrature-phase late loop 318 so as to produce a late correlation signal. The first, second, and third square root circuits 232, 233 and 234 are used to provide a square root of the early, punctual, and late correlation signals from the adders 229, 230, 231 for compensating the early, punctual, and late correlation signals for the non-coherent effect. The first, second, and third averaging circuit 235, 236, 237 are used to take the average of the signals outputted from the first, second, and third square root circuits 232, 233, 234 and outputting an early, punctual, and late correlation-compensated signals having smoothed correlation feature.

The adaptive threshold controller 249, which can be constructed by one skilled in the art, is used for receiving the I-channel digital spread signal outputted from the in-phase converting part 304 and the Q-channel digital spread signal outputted from the quadrature-phase converting part 306 and then adaptively generating a variable threshold according to the PN punctual code generated from the PN code generator 248. The initial synchronization detecting unit 320 is comprised of comparators 238, 239 and 240, an OR gate 241 and a sync detector 242, for receiving the respective average values of the first, second and third averaging circuits 235, 236 and 237, comparing these average values with the variable threshold provided from the adaptive threshold controller 249 and outputting an initial synchronization detection signal indicating whether or not the initial synchronization has been achieved. The synchronization tracking control unit 322 is comprised of an adder 243, a scaler 244 and a comparator 245, for receiving the average values of the early and late correlation compensated signals outputted from the first and third averaging circuits 235 and 237 and the variable threshold provided from the adaptive threshold controller 249 so as to produce an error signal reflecting a phase difference between the average values of the early and late correlation-compensated signals and then produce a synchronization tracking control signal on the basis of the error signal. The clock controller 246 is used to respond to the initial synchronization detection signal outputted from the initial synchronization detecting part 320, the error signal and synchronization tracking control signal outputted from the synchronization tracking control part 322 to generate a clock generation control signal so as to control the clock generator 247 to generate a PN clock. The reference PN code generator 248 is used to respond to the PN clock outputted from the clock generator 247 to generate the PN early code, the PN punctual code and the PN late code for correlation. The demodulator 250 is used to perform the non-coherent detection of the in-phase punctual signal outputted from the in-phase punctual loop 310 and quadrature-phase punctual signal outputted from the quadrature-phase punctual loop 316 and demodulate the received spread spectrum signal into the original baseband signal. The latch 251 is used to receive the demodulated data outputted from the demodulator 250, synchronizing the received data with the data clock generated from the clock generator 247 and then outputting the synchronized data.

Figure 3A:
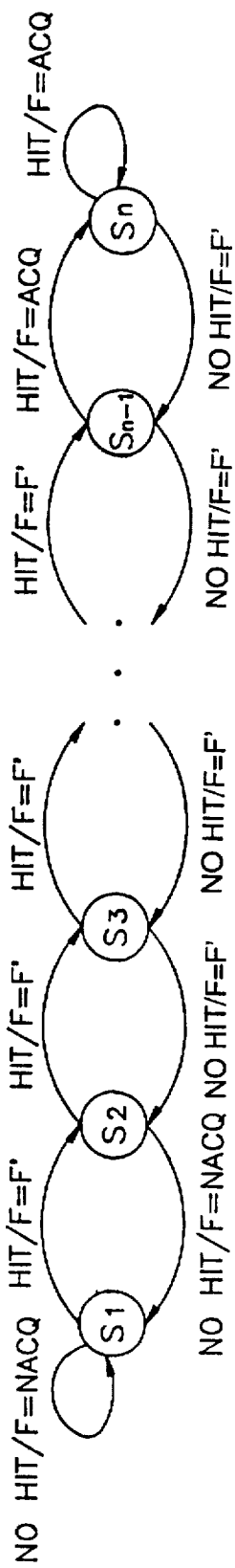
FIGS. 3A and 3B are schematic diagrams showing the synchronization detection state according to the principles of the present invention.
Figure 3B:
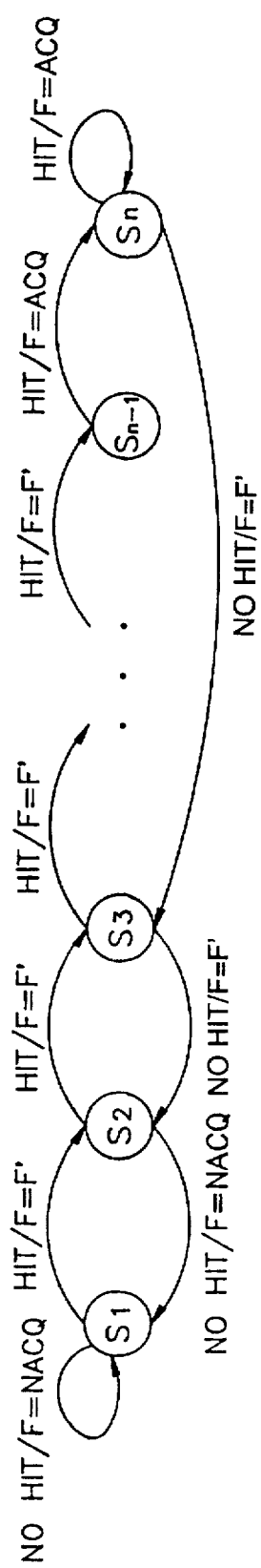

FIGS. 3A and 3B illustrate a synchronization detection state according to the present invention. The preferred embodiment of the present invention will now be described in detail with reference to FIGS. 2A to 3B.

The spread spectrum signal applied from the antenna 201 is amplified by the amplifier 202, and then is passed through the BPF 203. The mixer 204 mixes the filtered spread-spectrum signal with a carrier signal generated from the carrier generator 205 so as to remove the carrier of the received spread spectrum signal for subsequent conversion into the IF signal. Thereafter, the mixed signal is passed through the BPF 206. At this time, the IF oscillator 209 generates the IF oscillation signal to convert the received spread spectrum signal into the IF signal. The output of the BPF 206 is separated into an I-channel spread signal and a Q-channel spread signal, and the IF components thereof are removed at the mixers 210 and 212. The IF oscillation signal is phase shifted by $\pi/2$ through the $\pi/2$ phase shifter 211 and then is multiplied by the Q-channel spread signal. The construction for processing the Q-channel spread signal is the same as that for processing the I-channel spread signal, and the description will be made on the basis of the operation for separating and processing the I-channel spread signal.

The I-channel spread signal in which the carrier and IF components have been removed at the mixer 210 is passed through the LPF 213 and then is converted into a digital signal by the A/D converter 215. The sampling rate at the digital conversion is typically more than twice the PN chip rate. At the correlators 217, 218 and 219, the I-channel spread signal which has been converted into the digital signal is multiplied respectively by the early, punctual and late PN codes outputted from the reference PN code generator 248 to be reverse-spread. The phase of the early PN code is faster than that of the punctual PN code by ½ chip($\pi/2$), and the phase of the late PN code is delayed by ½ chip($\pi/2$) in comparison with the phase of the punctual PN code.

The correlators 217, 218 and 219 generally take the correlation every data symbol, and a data symbol may be a period of the PN code sequence or a part of the long PN code sequence. The I-channel digital signals which have been reverse-spread at the correlators 217, 218 and 219 are squared by the squaring circuits 223, 224 and 225.

The Q-channel spread signal in which the carrier and IF components have been removed by the mixer 212 is passed through the LPF 214 and then is converted into the digital signal through the A/D converter 216. The sampling rate at the digital conversion is typically more than twice the PN chip rate. The Q-channel spread signal which has been converted into the digital signal is multiplied respectively by the early, punctual and late PN codes outputted from the reference PN code generator 248 to be reverse-spread at the correlators 220, 221 and 222. The Q-channel digital signals which have been reverse-spread through the correlators 220, 221 and 222 are squared through the squaring circuits 226, 227 and 228. The I-channel digital spread signal outputted from the squaring circuit 223 and the Q-channel digital spread signal outputted from the squaring circuit 226 are added at the adder 229. The output signal of the adder 229 is applied to a first square root circuit 232 and then is outputted as an early correlation-compensated signal compensated for the non-coherent effect. The I-channel digital spread signal outputted from the squaring circuit 224 and the Q-channel signal outputted from the squaring circuit 227 are added at the adder 230. The output signal of the adder 230 is applied to a second square root circuit 233 and then is outputted as a punctual correlation-compensated signal compensated for the non-coherent effect. The I-channel digital spread signal outputted from the squaring circuit 225 and the Q-channel digital spread signal outputted from the squaring circuit 228 are added at the adder 231. The output signal of the adder 231 is applied to a third square root circuit 234 and then is outputted as a late correlation-compensated signal compensated for the non-coherent effect. The punctual correlation-compensated signal is employed for the initial synchronization, and the early and late correlation-compensated signals for the synchronization tracking. In case of spreading one data symbol every period of the PN code, the early correlation-compensated signal takes the correlation for one period and shows a typical self-correlation feature. However, in case of spreading one data symbol corresponding to a part of the PN code sequence, the early correlation-compensated signal takes the correlation for a part of the PN code sequence corresponding to the data symbol. Such a partial correlation feature of the early signal makes it difficult to perform the initial synchronization and synchronization tracking.

To compensate the effect due to the partial correlation feature during the initial synchronization and the synchronization tracking, the first, second and third averaging circuits 235, 236 and 237 receive the early, punctual and late correlation-compensated signals outputted from the first to third square root circuits 232, 233 and 234, take respective averages thereof and then output the early, punctual and late signals in which the partial correlation features have been smoothed. The adaptive threshold controller 249 receives the I-channel digital spread signal from the A/D converter 215, the Q-channel digital spread signal from the A/D converter 216 and a predetermined PN punctual code and then adaptively generates a variable threshold. The initial synchronization and synchronization tracking can be performed more effectively by using the smoothed correlation feature showing a typical feature of the PN code sequence.

The initial synchronization is for synchronizing the phases of the received PN code and reference PN code within each chip. In the conventional art, the receiver compares the punctual signal with the predetermined threshold, and if the punctual signal is less than the predetermined threshold, indicates that the initial synchronization has not been achieved. Therefore, in case of using only punctual signal, the variance of the punctual signal is great when the PN code search for the initial synchronization is performed every chip, so that it is difficult to set up a proper threshold. In case of searching the PN code every ½ chip, the variance of the punctual signal can be reduced, however, there may occur a problem of increasing the time required in the initial synchronization. Consequently, in order to solve such a problem, the novel non-coherent digital receiver according to the present invention seeks to compare the averaged early, punctual and late signals with the variable threshold and then detects whether or not the initial synchronization has been achieved. That is, the comparators 238, 239 and 240 compare the average values of the early, punctual and late signals with the variable threshold outputted from the adaptive threshold controller 249 and then output the result of the comparison to the OR gate 241. If even one of these three signals is greater than the variable threshold, the OR gate 241 outputs the signal HIT. The signal HIT indicates that at least one of the early, punctual and late signals is greater than the threshold generated from the adaptive threshold controller 249, i.e., the received partial PN code accords to the reference partial PN code sequence within a chip. In case of performing the initial synchronization by using the above described early, punctual and late signals, even though the PN code is searched every a chip, it is possible to obtain the same effect as searching the PN code every ½ chip.

In this case, since the PN code is searched every chip, the time required in performing the initial synchronization can be reduced. Also, the variance of the early, punctual and late signals to be compared with the threshold is reduced, so that the threshold can be easily set up.

The novel non-coherent digital receiver constructed according to the present invention does not judge that the signal HIT is immediately initial-synchronized even when the PN synchronization has been achieved within a chip, and prevents the generation of the false alarm or false tracking failure by employing the sync detector 242 having a separate hysteresis. Namely, even though the PN synchronization is not actually achieved within a chip, if the signal HIT is outputted from the OR gate 241 due to noise, the system may judge that the initial synchronization has been achieved. Or alternatively, even though the PN code synchronization is not actually achieved, if the signal HIT is not generated due to noise, the system may judge that there occurs a false tracking failure. These malfunctions can be prevented by employing the sync detector 242. To prevent these malfunctions, the sync detector 242 having the hysteresis judges that the initial synchronization has been achieved, only when the signal HIT is repeatedly generated to reach to the final state Sn, as shown in FIGS. 3A and 3B. The step-by-step up and step-by-step down method of FIG. 3A changes the state step-by-step to reach the initial state S1 if the signal NO HIT is generated, whereas the step-by-step up and jumped down method of FIG. 3B jumps down to any state (e.g., S3) if the signal NO HIT is generated at the final state Sn and changes the state step-by-step to reach the initial state S1 if the signal NO HIT is continuously generated. With the method of FIG. 3A or FIG. 3B employing the hysteresis, the problem of the false alarm or false tracking failure can be solved.

The sync detector 242 outputs the signal ACQ of logic high state if the phase of the received spread signal is continuously synchronized with that of the reference PN code within one chip. If the signal ACQ is outputted, the system judges that the initial synchronization has been achieved and makes the synchronization tracking control part 322 and the data demodulator 250 operate.

The synchronization tracking functions to accord the phase of the reference PN code with the phase of the received spread signal, and to maintain the in-phase state of these two signals. For the synchronization tracking, the adder 243 adds the early correlation-compensated signal outputted from the first averaging circuit 235 to the late correlation-compensated signal outputted from the third averaging circuit 237 and then outputs the error signal reflecting the phase difference between the reference PN code and the received spread spectrum signal. The error signal outputted from the adder 243 controls the clock controller 246 to perform the synchronization tracking. The error signal is scaled to have a proper scaling factor through the scaler 244 and is then compared with the variable threshold generated from the adaptive threshold controller 249 through the comparator 245, thus controlling the clock controller 246. The clock controller 246 controls the clock generator 247 to synchronize the phase of the received spread signal with that of the reference PN code by using the initial synchronization detection signal of the sync detector 242 and the output signal of the comparator 245 during the initial synchronization and the synchronization tracking. Every time starting the partial correlation, the clock controller 246 controls the clock generator 247 to delay the PN clock by one clock. If the early signal is greater than the late signal and the output of the scaler 244 is greater than the threshold, the clock generator 247 judges that the phase of the received spread signal is ahead as compared to that of the reference PN code and controls the clock generator 247 to generate the clock fast in proportion to the phase difference. On the contrary, if the late signal is greater than the early signal and the output of the scaler 244 is greater than the threshold, the clock generator 247 judges that the phase of the received spread signal is delayed as compared to that of the reference PN code and controls the clock generator 247 to generate the clock slowly in proportion to the phase difference. In the case that the above two conditions are not satisfied, the clock generator 246 judges that the received spread signal is in-phase with the reference PN code and controls the clock generator 247 to maintain the phase of the PN clock.

However, if the sync detector 242 outputs the signal of logic low state, it judges that there occurred the synchronization tracking failure or the synchronization loss, and repeats the initial synchronization and synchronization tracking. If the initial synchronization and synchronization tracking have been achieved, the data demodulator 250 demodulates the reception data into a base band data by using the in-phase punctual signal outputted from the correlator 218 and the quadrature-phase punctual signal outputted from the correlator 221. The latch 251 synchronizes the demodulated data with the clock signal outputted from the clock generator 247.

As described above, the present invention converts the signal the carrier and IF component of which have been removed into the digital signal, thereby miniaturizing the system and improving the reliability by preventing the malfunction due to the noise. In addition, it is possible to reduce the time required in performing the initial synchronization by comparing the early, punctual and late correlation-compensated signals with a variable threshold set up according to the variance of the punctual signal.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A receiver, comprising:
   means for receiving a spread spectrum signal having a received pseudo-noise code sequence modulated therein, and for generating an in-phase signal and a quadrature-phase signal;
   a pseudo-noise code generator for generating a reference pseudo-noise code sequence comprising a pseudo-noise early code, a pseudo-noise punctual code, and a pseudo-noise late code in response to a pseudo-noise clock signal;
   correlator means for correlating said in-phase signal and said quadrature-phase signal with said pseudo-noise early code, said pseudo-noise punctual code, and said pseudo-noise late code, respectively, to generate an early correlation signal, a punctual correlation signal, and a late correlation signal, respectively, each comprising both in-phase and quadrature-phase components;
   an adaptive threshold controller for receiving said in-phase signal and said quadrature-phase signal to adaptively generate a variable threshold in response to said pseudo-noise punctual code;
   synchronization detecting and tracking means for comparing said early, punctual and late correlation signals with said variable threshold, respectively, to produce an initial synchronization detection signal, for combining said early and late correlation signals to produce an error signal proportional to a phase difference between said received pseudo-noise code sequence modulated in said spread spectrum signal and said reference pseudo-noise code sequence, and for comparing said error signal with said variable threshold to produce a synchronization tracking control signal;
   means for generating said pseudo-noise clock signal to control generation of said reference pseudo-noise code sequence and synchronization between said received pseudo-noise code sequence modulated in said spread spectrum signal and said reference pseudo-noise code sequence based upon reception of said initial synchronization detection signal, said error signal and said synchronization tracking control signal; and
   a demodulator coupled to receive said punctual correlation signal comprising said in-phase and quadrature-phase components, for demodulating said spread spectrum signal into a baseband signal.

2. The receiver as claimed in claim 1, wherein said correlator means comprises:
   a first correlator for generating a first correlation signal by correlating noncoherently said in-phase signal with said pseudo-noise early code;
   a first squaring circuit for squaring said first correlation signal;
   a second correlator for generating a second correlation signal by correlating noncoherently said in-phase signal with said pseudo-noise punctual code;
   a second squaring circuit for squaring said second correlation signal;
   a third correlator for generating a third correlation signal by correlating noncoherently said in-phase signal with said pseudo-noise late code;
   a third squaring circuit for squaring said third correlation signal;
   a fourth correlator for generating a fourth correlation signal by correlating noncoherently said quadrature-phase signal with said pseudo-noise early code;
   a fourth squaring circuit for squaring said fourth correlation signal;
   a fifth correlator for generating a fifth correlation signal by correlating noncoherently said quadrature-phase signal with said pseudo-noise punctual code;
   a fifth squaring circuit for squaring said fifth correlation signal;
   a sixth correlator for generating a sixth correlation signal by correlating noncoherently said quadrature-phase signal with said pseudo-noise late code;
   a sixth squaring circuit for squaring said sixth correlation signal;
   a first adder for providing a first added signal by adding the squares of said first and fourth correlation signals;
   a first square root circuit for providing a square root of said first added signal;
   a first averaging circuit for generating said early correlation signal by providing an average of said square root of said first added signal;
   a second adder for providing a second added signal by adding the squares of said second and fifth correlation signals;
   a second square root circuit for providing a square root of said second added signal;
   a second averaging circuit for generating said punctual correlation signal by providing an average of said square root of said second added signal;
   a third adder for providing a third added signal by adding the squares of said third and sixth correlation signals;
   a third square root circuit for providing a square root of said third added signal; and
   a third averaging circuit for generating said late correlation signal by providing an average of said square root of said third added signal.

3. The receiver as claimed in claim 1, wherein said synchronization detecting and tracking means comprises:
  a comparator for comparing said early, punctual and late correlation signals with said variable threshold respectively, and for generating an initial synchronization judging signal indicating whether an initial synchronization with said spread spectrum signal has been achieved;
  a synchronization detector coupled to receive said initial synchronization judging signal, for detecting noise components from said spread spectrum signal, and generating said initial synchronization detection signal;
  a fourth adder for combining said early and late correlation signals to providing said error signal;
  a scaler for providing a scaled error signal by scaling said error signal by a scaling factor; and
  comparator for comparing said scaled error signal with said variable threshold to produce said synchronization detection control signal.

4. The receiver as claimed in claim 1, wherein said pseudo-noise early, punctual and late codes are spaced apart from each other temporally by one chip interval.

5. A spread spectrum communication receiver, comprising:
  means for receiving a spread spectrum signal having a received pseudo-noise code sequence modulated therein, and for generating an in-phase signal and a quadrature-phase signal;
  a pseudo-noise code generator for generating a reference pseudo-noise code sequence comprising a pseudo-noise early code, a pseudo-noise punctual code, and a pseudo-noise late code in response to a pseudo-noise clock signal;
  correlation means for correlating said in-phase signal and said quadrature-phase signal with said pseudo-noise early code, said pseudo-noise punctual code, and said pseudo-noise late code, respectively, to generate an early correlation signal, a punctual correlation signal, and a late correlation signal;
  an adaptive threshold controller for receiving said in-phase signal and said quadrature-phase signal to adaptively generate a variable threshold in response to said pseudo-noise punctual code;
  an initial synchronization detector for comparing said early, punctual and late correlation signals with said variable threshold, respectively, to generate an initial synchronization detection signal indicating that said received pseudo-noise code sequence modulated in said spread spectrum signal is in-phase with said reference pseudo-noise code sequence;
  a synchronization tracking controller for combining said early and late correlation signals to produce an error signal proportional to a phase difference between said received pseudo-noise code sequence modulated in said spread spectrum signal and said reference pseudo-noise code sequence, and for comparing said error signal and said variable threshold to produce a synchronization tracking control signal;
  means for generating said pseudo-noise clock signal to control generation of said reference pseudo-noise code sequence and synchronization between said received pseudo-noise code sequence modulated in said spread spectrum signal and said reference pseudo-noise code sequence based upon said initial synchronization detection signal, said error signal and said synchronization tracking control signal; and
  a demodulator for performing non-coherent detection of a punctual correlation of said in-phase signal and a punctual correlation of said quadrature-phase signal, and for demodulating said spread spectrum signal into a baseband signal.

6. The spread spectrum communication receiver as claimed in claim 5, wherein said correlation means comprises:
  a first correlator for generating a first correlation signal by correlating noncoherently said in-phase signal with said pseudo-noise early code;
  a first squaring circuit for squaring said first correlation signal;
  a second correlator for generating a second correlation signal by correlating noncoherently said in-phase signal with said pseudo-noise punctual code;
  a second squaring circuit for squaring said second correlation signal;
  a third correlator for generating a third correlation signal by correlating noncoherently said in-phase signal with said pseudo-noise late code;
  a third squaring circuit for squaring said third correlation signal;
  a fourth correlator for generating a fourth correlation signal by correlating noncoherently said quadrature-phase signal with said pseudo-noise early code;
  a fourth squaring circuit for squaring said fourth correlation signal;
  a fifth correlator for generating a fifth correlation signal by correlating noncoherently said quadrature-phase signal with said pseudo-noise punctual code;
  a fifth squaring circuit for squaring said fifth correlation signal;
  a sixth correlator for generating a sixth correlation signal by correlating noncoherently said quadrature-phase signal with said pseudo-noise late code;
  a sixth squaring circuit for squaring said sixth correlation signal;
  a first adder for providing a first added signal by adding the squares of said first and fourth correlation signals;
  a first square root circuit for providing a square root of said first added signal;
  a first averaging circuit for generating said early correlation signal by providing an average of said square root of said first added signal;
  a second adder for providing a second added signal by adding the squares of said second and fifth correlation signals;
  a second square root circuit for providing a square root of said second added signal;
  a second averaging circuit for generating said punctual correlation signal by providing an average of said square root of said second added signal;
  a third adder for providing a third added signal by adding the squares of said third and sixth correlation signals;
  a third square root circuit for providing a square root of said third added signal; and
  a third averaging circuit for generating said late correlation signal by providing an average of said square root of said third added signal.

7. The spread spectrum communication receiver as claimed in claim 6, wherein said synchronization tracking controller comprises:

a fourth adder for combining said early and late correlation signals to produce said error signal;

a scaler for providing a scaled error signal by scaling said error signal by a scaling factor; and a comparator for comparing said scaled error signal with said variable threshold to produce said synchronization detection control signal.

8. The spread spectrum communication receiver as claimed in claim 5, wherein said initial synchronization detector comprises:

a comparator for comparing said early, punctual and late correlation signals with said variable threshold respectively, and for generating an initial synchronization judging signal indicating whether an initial synchronization with said spread spectrum signal has been achieved; and a synchronization detector coupled to receive said initial synchronization judging signal, for detecting noise components from said spread spectrum signal, and generating said initial synchronization detection signal.

9. A method using a spread spectrum receiver for demodulating a spread spectrum signal having a data signal modulated with a pseudo-noise code sequence, comprising the steps of:

receiving the spread spectrum signal, and generating an in-phase channel spread baseband signal and a quadrature-phase channel spread baseband signal therefrom;

generating a reference pseudo-noise code sequence comprising an early pseudo-noise code, a punctual pseudo-noise code, and a late pseudo-noise code in response to a pseudo-noise clock signal;

correlating said in-phase channel spread baseband signal with said early, punctual, and late pseudo-noise codes, respectively, to generate early, punctual, and late in-phase channel correlation signals, respectively;

correlating said quadrature-phase channel spread baseband signal with said early, punctual, and late pseudo-noise codes, respectively, to generate early, punctual, and late quadrature-phase channel correlation signals;

generating early, punctual, and late correlation-compensated signals by compensating partial correlations of said early, punctual, and late in-phase channel and quadrature-phase channel correlation signals, respectively;

adaptively generating a variable threshold based upon said in-phase channel spread baseband signal and said quadrature-phase channel spread baseband signal in accordance with said punctual pseudo-noise code;

generating an initial synchronization detection signal indicating that a received pseudo-noise code sequence modulated in said spread spectrum signal is in phase with said reference pseudo-noise code sequence based upon a comparison between said early, punctual, and late correlation-compensated signals and said variable threshold, respectively;

generating an error signal proportional to a phase difference between said received pseudo-noise code sequence modulated in said spread spectrum signal and said reference pseudo-noise code sequence based upon a combination of said early and late correlation-compensated signals, and for generating a synchronization tracking control signal based upon a comparison between said error signal and said variable threshold;

generating said pseudo-noise clock signal to control generation of said reference pseudo-noise code sequence and synchronization between said received pseudo-noise code sequence modulated in said spread spectrum signal and said reference pseudo-noise code sequence based upon said initial synchronization detection signal, said error signal and said synchronization tracking control signal; and detecting noncoherently said punctual in-phase channel correlation signal and said punctual quadrature-phase channel correlation signals and demodulating said spread spectrum signal into a base-band signal.

10. The method of claim 13, wherein said synchronization tracking control signal is generated by:

adding said early and late correlation-compensated signals to provide said error signal proportional to said phase difference between said received pseudo-noise code sequence modulated in said spread spectrum signal and said reference pseudo-noise code sequence;

scaling said error signal by a scaling factor; and comparing the scaled error signal with said variable threshold.

11. A non-coherent digital receiver of a spread spectrum communication system, comprising:

receiver means for receiving a spread spectrum signal and generating an in-phase signal and a quadrature-phase signal;

pseudo-noise code generating means for generating a plurality of reference pseudo-noise codes comprising a pseudo-noise early code, a pseudo-noise punctual code, and a pseudo-noise late code in response to a pseudo-noise clock signal;

in-phase early loop means for correlating said in-phase signal with said pseudo-noise early code to generate an in-phase early signal;

in-phase punctual loop means for correlating said in-phase signal with said pseudo-noise punctual code to generate an in-phase punctual signal;

in-phase late loop means for correlating said in-phase signal with said pseudo-noise late code to generate an in-phase late signal;

quadrature-phase early loop means for correlating said quadrature-phase signal with said pseudo-noise early code to generate a quadrature-phase early signal;

quadrature-phase punctual loop means for correlating said quadrature-phase signal with said pseudo-noise punctual code to generate a quadrature-phase punctual signal;

quadrature-phase late loop means for correlating said quadrature-phase signal with said pseudo-noise late code to generate a quadrature-phase late signal;

correlation compensation means for compensating correlations of said in-phase early, punctual and late signals and said quadrature-phase early, punctual and late signals to generate correlation-compensated early, punctual and late signals, respectively;

adaptive threshold control means for receiving said in-phase signal and said quadrature-phase signal to adaptively generate a variable threshold in response to said pseudo-noise punctual code;

initial synchronization detecting means for comparing said correlation-compensated early, punctual and late signals with said variable threshold, respectively, to generate an initial synchronization detection signal;

synchronization tracking control means for combining said correlation-compensated early and late signals to produce an error signal, and for comparing said error signal and said variable threshold to produce a synchronization tracking control signal;

clock control means for generating a clock control signal based upon said initial synchronization detection signal, said error signal and said synchronization tracking control signal;

clock generating means for generating said pseudo-noise clock signal based upon said clock generation control signal; and demodulating means for performing non-coherent detection of said in-phase punctual signal and said quadrature-phase punctual signal, and for demodulating said spread spectrum signal into baseband data.

12. The non-coherent digital receiver as claimed in claim 11, wherein said correlation compensation means comprises:

a first adder for providing an early signal by adding said in-phase early signal to said quadrature-phase early signal;

a first square root circuit for providing a square root of said early signal compensated for non-coherent effect;

a first averaging circuit for generating said correlation-compensated early signal by providing an average of said square root of said early signal;

a second adder for providing a punctual signal by adding said in-phase punctual signal to said quadrature-phase punctual signal;

a second square root circuit for providing a square root of said punctual signal compensated for the non-coherence effect;

a second averaging circuit for generating said correlation-compensated punctual signal by providing an average of said square root of said punctual signal;

a third adder for providing a late signal by adding said in-phase late signal to said quadrature-phase late signal;

a third square root circuit for providing a square root of said late signal compensated for the non-coherence effect; and a third averaging circuit for generating said correlation-compensated late signal by providing an average of said square root of said late signal.

13. The non-coherent digital receiver as claimed in claim 12, wherein said initial synchronization detecting means comprises:

comparator means for comparing said correlation-compensated early, punctual and late signals with said variable threshold respectively, and for generating an initial synchronization judging signal indicating whether an initial synchronization with said spread spectrum signal has been achieved; and synchronization detection means coupled to receive said initial synchronization judging signal, for detecting noise components from said spread spectrum signal, and generating said initial synchronization detection signal.

14. The non-coherent digital receiver as claimed in claim 12, wherein said synchronization tracking control means comprises:

a fourth adder for providing said error signal representing a phase difference between said reference pseudo-noise code and a code modulated with said spread spectrum signal by adding said correlation-compensated early signal and said correlation-compensated late signal;

a scaler for providing a scaled error signal by scaling said error signal by a scaling factor; and a comparator for comparing said scaled error signal with said variable threshold and generating said synchronization detection control signal.

15. A method using a spread spectrum receiver for demodulating a spread spectrum signal having a data signal modulated with a pseudo-noise code sequence, comprising the steps of:

receiving the spread spectrum signal and generating an in-phase signal and a quadrature-phase signal;

sampling repetitively said in-phase signal and said quadrature-phase signal at a rate at least twice a chip rate of said spread spectrum signal to generate a plurality of in-phase samples and a plurality of quadrature-phase samples, respectively;

generating a reference pseudo-noise code sequence comprising a first pseudo-noise code, a second pseudo-noise code, and a third pseudo-noise code in response to a pseudo-noise clock signal;

correlating noncoherently said plurality of in-phase samples with said first, second, and third pseudo-noise codes, respectively, to generate first, second, and third in-phase correlation signals, and for generating first, second, and third output correlation signals based upon a square of said first, second, and third in-phase correlation signals, respectively;

correlating noncoherently said plurality of quadrature-phase samples with said first, second, and third pseudo-noise codes, respectively, to generate first, second, and third quadrature-phase signals, and for generating fourth, fifth, and sixth output correlation signals based upon a square of said first, second, and third quadrature-phase signals, respectively;

compensating partial correlations of said first, second, third, fourth, fifth, and sixth output correlation signals to generate first, second, and third correlation-compensated signals, respectively;

adaptively generating a variable threshold based upon said in-phase signal and said quadrature-phase signal in accordance with said second pseudo-noise code;

generating an initial synchronization detection signal representing that a received pseudo-noise code sequence modulated in said spread spectrum signal is in-phase with said reference pseudo-noise code sequence based upon a comparison between said first, second, and third correlation-compensated signals and said variable threshold, respectively;

generating an error signal proportional to a phase difference between said received pseudo-noise code sequence modulated in said spread spectrum signal and said reference pseudo-noise code sequence by combining said first and third correlation-compensated signals, and for generating a synchronization tracking control signal by comparing said error signal with said variable threshold;

generating said pseudo-noise clock signal to control generation of said reference pseudo-noise code sequence and synchronization between said received pseudo-noise code sequence modulated in said spread spectrum signal and said reference pseudo-noise code sequence based upon said initial synchronization detection signal, said error signal and said synchronization tracking control signal; and detecting noncoherently said second in-phase correlation signal and said second quadrature-phase correlation signal, and demodulating said spread spectrum signal into a base-band signal.

16. The method of claim 15, wherein said first, second, and third pseudo-noise codes represent early, punctual and late pseudo-noise codes, respectively, said early, punctual, and late pseudo-noise codes being spaced apart from each other temporally by one chip interval.

17. The method of claim 15, wherein said first, second, third, fourth, fifth, and sixth output correlation signals are partially compensated by:

adding said first and fourth output correlation signals, and determining a square root and an average of the added signal to generate said first correlation-compensated signal;

adding said second and fifth output correlation signals, and determining a square root and an average of the added signal to generate said second correlation-compensate signal; and adding said third and sixth output correlation signals, and determining a square root and an average of the added signal to generate said third correlation-compensated signal.

18. The method of claim 15, wherein said synchronization tracking control signal is generated by:

adding said first and third correlation-compensated signals to provide said error signal proportional to said phase difference between said received pseudo-noise code sequence modulated in said spread spectrum signal and said reference pseudo-noise code sequence;

scaling said error signal by a scaling factor; and comparing the scaled error signal with said variable threshold.

19. A non-coherent digital receiver of a spread spectrum communication system, comprising:

means for converting a received spread spectrum signal into an intermediate-frequency signal;

means for generating a first oscillation signal and a second oscillation signal;

in-phase converting means for generating a first channel digital signal by mixing said intermediate-frequency signal with said first oscillation signal, removing intermediate-frequency components, extracting in-phase components;

pseudo-noise code generating means for generating a reference pseudo-noise code sequence in response to a pseudo-noise clock signal;

in-phase loop means for generating an in-phase early digital signal, an in-phase punctual digital signal and an in-phase late digital signal, respectively, by determining correlations between said first channel digital signal with each of a pseudo-noise early code, a pseudo-noise punctual code and a pseudo-noise late code of said reference pseudo-noise code sequence, respectively, and squaring said correlations;

quadrature-phase converting means for generating a second channel digital signal by mixing said intermediate-frequency signal with said second oscillation signal, removing intermediate-frequency components, and extracting quadrature-phase components;

quadrature-phase loop means for generating a quadrature-phase early digital signal, a quadrature-phase punctual digital signal and a quadrature-phase late digital signal by determining correlations between said second channel digital signal with each of said pseudo-noise early code, said pseudo-noise punctual code and said pseudo-noise late code, respectively, and squaring said correlations;

correlation compensation means for generating correlation-compensated early, punctual and late digital signals, respectively, by compensating the correlations of said in-phase early, punctual and late digital signals and said quadrature-phase early, punctual and late digital signals;

adaptive threshold control means coupled to receive said first channel digital signal and said second channel digital signal, for adaptively generating a variable threshold in response to said pseudo-noise punctual code;

initial synchronization detecting means for generating an initial synchronization detection signal by comparing said correlation-compensated early, punctual and late digital signals with said variable threshold;

synchronization tracking control means for generating an error signal in dependence upon said correlation-compensated early and late digital signals, and for generating a synchronization detection control signal in dependence upon said error signal and said variable threshold;

clock control means for generating a clock generation control signal in dependence upon reception of said initial synchronization detection signal, said error signal and said synchronization detection control signal;

clock generating means for generating said pseudo-noise clock signal in dependence upon said clock generation control signal; and demodulating means for performing non-coherent detection of said in-phase punctual digital signal which has taken the correlation from said in-phase loop means, and said quadrature-phase punctual digital signal which has taken the correlation from said quadrature-phase loop means, and for demodulating said received spread spectrum signal into baseband data.

20. The non-coherent digital receiver as claimed in claim 19, wherein said correlation compensation means comprises:

a first adder for providing an early digital signal by adding said in-phase early digital signal to said quadrature-phase early digital signal;

a first square root circuit for providing a square root of said early digital signal compensated for non-coherent effect;

a first averaging circuit for generating said correlation-compensated early digital signal by providing an average of said square root of said early digital signal;

a second adder for providing a punctual digital signal by adding said in-phase punctual digital signal to said quadrature-phase punctual digital signal;

a second square root circuit for providing a square root of said punctual digital signal compensated for the non-coherence effect;

a second averaging circuit for generating said correlation-compensated punctual digital signal by providing an average of said square root of said punctual digital signal;

a third adder for providing a late digital signal by adding said in-phase late digital signal to said quadrature-phase late digital signal;

a third square root circuit for providing a square root of said late digital signal compensated for the non-coherence effect; and a third averaging circuit for generating said correlation-compensated late digital signal by providing an average of said square root of said late digital signal.

21. The non-coherent digital receiver as claimed in claim 20, wherein said initial synchronization detecting means comprises:

comparator means for comparing said correlation-compensated early, punctual and late digital signals with said variable threshold respectively, and for generating an initial synchronization judging signal indicating whether an initial synchronization with said received spread spectrum signal has been achieved; and synchronization detection means coupled to receive said initial synchronization judging signal, for detecting erroneous initial synchronization of said received spread spectrum signal triggered by noise, and for generating said initial synchronization detection signal.

22. The non-coherent digital receiver as claimed in claim 20, wherein said synchronization tracking control means comprises:

a fourth adder for providing said error signal representing a phase difference between said reference pseudo-noise code and a code modulated with said received spread spectrum signal by adding said correlation-compensated early digital signal and said correlation-compensated late digital signal;

a scaler for providing a scaled error signal by scaling said error signal by a scaling factor; and a comparator for comparing said scaled error signal with said variable threshold and generating said synchronization detection control signal.

* * * * *